US006952512B2

(12) United States Patent
Parker et al.

(10) Patent No.: US 6,952,512 B2
(45) Date of Patent: Oct. 4, 2005

(54) COMPENSATOR FOR COMPENSATION OF HIGHER-ORDER CHROMATIC DISPERSION

(75) Inventors: Michael C. Parker, Colchester (GB); Stuart D. Walker, Colchester (GB)

(73) Assignee: Fujitsu Limited, Kawasaki (JP)

( * ) Notice: Subject to any disclaimer, the term of this patent is extended or adjusted under 35 U.S.C. 154(b) by 49 days.

(21) Appl. No.: 10/471,924

(22) PCT Filed: Mar. 15, 2002

(86) PCT No.: PCT/GB02/01285

§ 371 (c)(1),
(2), (4) Date: Sep. 15, 2003

(87) PCT Pub. No.: WO02/075982

PCT Pub. Date: Sep. 26, 2002

(65) Prior Publication Data

US 2004/0096217 A1 May 20, 2004

(30) Foreign Application Priority Data

Mar. 16, 2001 (GB) .............................. 0106590

(51) Int. Cl.[7] ................................................ G02B 6/26
(52) U.S. Cl. ............................ 385/39; 385/37; 385/24; 398/147
(58) Field of Search ............................ 385/24, 27, 37, 385/39, 123

(56) References Cited

U.S. PATENT DOCUMENTS 5,602,666 A * 2/1997 Ishikawa et al. ............ 398/159

FOREIGN PATENT DOCUMENTS

| EP | 0 795 973 A1 | 9/1997 |
|---|---|---|
| JP | 07104137 | 4/1995 |
| WO | WO 99/42872 | 8/1999 |
| WO | WO 00/75702 A1 | 12/2000 |

OTHER PUBLICATIONS

F. Farjady et al., "Non–Linear Phase Apodisation Techniques for Arrayed–Waveguide Grating Passband Control" IEE Colloquium on Multiwavelength Optical Networks: Devices, Systems and Network Implementations, IEE London, GB, Jun. 17, 1998, pp. 9/1–9/5, XP000783512.
B.J. Eggleton et al., "Electronically Tunable Power Efficient Dispersion Compensating Fiber Bragg Grating" IEEE Photonics Tech. Lett. 11(7), 854 (1999).
L.D. Garrett et al., "Demonstration of Virtually–Imaged Phased–Array Device for Tunable Dispersion Compensation in 16 x 10Gb/s WDM Transmission Over 480km Standard Fiber" Paper PD7, Baltimore, Maryland, Mar. 2000.
C.K. Madsen, G. Lenz "A Multi–Channel Dispersion Slope Compensating Optical Allpass Filter" *OFC 2000*, Paper WF5, Baltimore, Maryland, Mar. 2000.
Michael C. Parker, Stuart D. Walker "Virtually Ripple–Free, Multi–Channel, Adaptive Dispersion Compensator Based on a Re–Multiplexing A WG Cascade", PROC. ECOC2000, Paper p2.7, Munich, Sep. 2000.
A.J. Lowery, Phil C.R. Gurney, "270–km 10 Gbit/s WDM Dispersion compensation Using a Chirped A WGM", Proc. OFC 1999, Paper FD5, San Diego, California, Feb. 1999.
Michael C. Parker et al., "Design of Arrayed–Waveguide Gratings Using Hybrid Fourier–Fresnel Transform Techniques", *IEEE Journal of Special Topics in Quantum Electronics on Fibre–optic Passive Components*, 5(5), 1379 1999.

* cited by examiner

Primary Examiner—Phan T. H. Palmer
(74) Attorney, Agent, or Firm—Baker Botts L.L.P.

(57) ABSTRACT

A chromatic-dispersion compensator comprises a plurality of dispersive elements (Q in number. $Q \geq 2$) each exhibiting a dispersion characteristic $D(\lambda)$ that varies substantially as a polynominal function of wavelength, the polynomial function being of an order (P–2) greater than 0, the dispersion characteristics being displaced in wavelength relative to each other such that the compensator has a net Pth-order dispersion characteristic $D_p$ that is non-zero and does not vary substantially with wavelength an operating bandwidth.

30 Claims, 9 Drawing Sheets

COMPENSATOR FOR COMPENSATION OF HIGHER-ORDER CHROMATIC DISPERSION

CROSS REFERENCE TO RELATED APPLICATIONS

This application claims priority under 35 U.S.C. §119 of PCT application number PCT/GB02/01285 filed Mar. 15, 2002, entitled "A Compensator for Compensation of Higher-Order Chromatic Dispersion" which claims priority to British application number 0106590.3 filed Mar. 16, 2001 and entitled "A Compensator for Compensation of Higher-Order Chromatic Dispersion".

This invention relates to the field of compensators for compensation of higher-order chromatic-dispersion and in particular to such compensators for use in optical-fibre networks. "Higher-order chromatic dispersion" refers to chromatic dispersion of an order P higher than second order (i.e. P>2).

Wave-division-multiplexed (WDM) networks are important communications systems. As channel bit-rates have increased, the problem of temporal dispersion in dense WDM networks has become an increasingly important consideration in system design. There is a need for devices providing dynamically variable, uniform dispersion compensation over a large bandwidth.

Dynamic second-order dispersion compensation has been demonstrated using, for example, fibre Bragg gratings (FBGs) [B. J. Eggleton et al., *IEEE Photonics Tech. Lett.* 11(7), 854 (1999)], a tunable etalon [L. D. Garrett, *Proc. OFC* 2000, Paper PD7, Baltimore, Md., March 2000], and a device based on a Gires-Tournois interferometer [C. K. Madsen, G. Lenz, *Proc. OFC* 2000, Paper WF5, Baltimore, Md., March 2000]. Such devices can be essentially viewed as periodic time-sampled systems. The inventors have already proposed the use of concatenated AWGs for compensation of second-order chromatic dispersion (see, for example, M. C. Parker, S. D. Walker, "Virtually ripple-free, multi-channel, adaptive dispersion compensator based on a re-multiplexing AWG cascade", Proc. ECOC2000, Paper P2.7, Munich, September 2000).

An object of the present invention is to provide a compensator for compensation of higher-order (P>2) chromatic dispersion that provides uniform higher-order dispersion compensation over a large bandwidth. The standard formula for the Pth-order filter dispersion characteristic $D_P$ with filter phase characteristic $\theta(\omega)$, where $\omega$ is the angular frequency, is given by:

$$D_P = \frac{\partial^{P-1}}{\partial \lambda^{P-1}}\left[\frac{\partial \theta(\omega)}{\partial \omega}\right] \approx \frac{\lambda_0^2}{2\pi c}\frac{\partial^P \theta(\lambda)}{\partial \lambda^P} \quad (1)$$

where c is the speed of light and $\lambda_0$ is the wavelength at the pass-band centre.

At the pass-band centre wavelength $\lambda_0$, the overall dispersion D may be approximated by a Taylor expansion about $\lambda_0$:

$$D(\lambda) = D'_2 + D'_3(\lambda-\lambda_0) + D'_4(\lambda-\lambda_0)^2 + \ldots + D'_P(\lambda-\lambda_0)^{P-2}$$

Here $D'_P \approx D_P$ at the centre wavelength $\lambda_0$.

According to the invention there is provided a chromatic-dispersion compensator comprising a plurality of dispersive elements (Q in number, $Q \geq 2$) each exhibiting a dispersion characteristic $D(\lambda)$ that varies substantially as a polynomial function of wavelength, the polynomial function being of an order (P−2) greater than 0 (i.e. (P−2)>0), the dispersion characteristics being displaced in wavelength relative to each other such that the compensator has a net Pth-order dispersion characteristic $D_P$ that is non-zero and does not vary substantially with wavelength over an operating bandwidth.

The dispersion characteristic $D(\lambda)$ may vary substantially as a polynomial because, for example, it varies as a polynomial exhibiting a ripple, such as a sinusoidal ripple. Thus the dispersion characteristic $D(\lambda)$ may vary as a polynomial when any ripple is disregarded.

It is well known that second order dispersion can be compensated for by a parabolic phase profile (i.e. linear chirp), but compensation of higher-order dispersions is a non-trivial problem. In the context of second order dispersion, a quadratic phase function $$\varphi(m) = \gamma\left(m - \frac{M}{2}\right)^2$$

is mathematically represented as a complex Gaussian function $$\exp\left[-j\gamma\left(m-\frac{M}{2}\right)^2\right].$$

When Fourier transformed, a Gaussian function conveniently yields another Gaussian function, so that the filter phase characteristic due to a linearly-chirped grating is also purely quadratic (parabolic) at the centre of the filter response. Taking the appropriate second differential of the filter parabolic phase response characteristic gives a constant value and hence a uniform second order dispersion characteristic.

However, the Fourier transform (FT) of a higher-order phase profile $\Phi(m) = \gamma|m-m/2|^P$ (complex exponential function) does not simply yield another complex exponential function with the appropriately higher order phase profile, in contrast to the special case of a parabolic phase (Gaussian function) which Fourier transforms to another Gaussian function with a purely parabolic phase profile. Instead, solutions to the FT of higher-order phase functions involve confluent hypergeometric and Whittaker functions. Those functions tend to have polynomial phase functions with all lower orders of dispersion present as well. Hence, a single grating device with a higher-order phase profile (such as that proposed by Lowery—A. J. Lowery, P. C. R. Gurney, Proc. OFC '99, Paper FD5, San Diego, Calif., February 1999) will tend to be dispersive for all lower orders as well; i.e. it will not dispersion compensate solely at the dispersion order of interest. It will also exhibit high ripple in the dispersion characteristic. To achieve higher-order dispersion compensation for a particular dispersion order only (or to achieve dispersion compensation in a controlled manner for all the lower orders as well), it is necessary to concatenate devices (appropriately detuned with respect to one another) to balance out the lower orders of dispersion (or achieve the desired level of dispersion at each particular order), and reduce the ripple in the dispersion order of interest.

Thus the higher-order dispersion characteristics of the individual dispersive elements may be shifted relative to each other in such a way that, for example, any ripple on the Pth-order dispersion characteristic $D_P$ is cancelled out by propagation through all of the elements of the compensator. For example, if there are four identical dispersive elements having such ripple, their Pth-order dispersion characteristics $D_P$ will be shifted by one quarter of a period relative to each other, so that troughs and peaks in the ripples of elements cancel out overall.

Of course, it is sufficient for the characteristic to enable the net Pth-order dispersion $D_P$ of the compensator to not vary substantially with wavelength over the operating bandwidth; variations outside that bandwidth are generally irrelevant.

The Pth-order dispersion characteristics $D_P$ of each of the elements may be of substantially the same form; however, they may be scaled in magnitude and/or wavelength. The number Q of dispersive elements required and the wavelength shifts required will depend upon those scalings; for example, it may be possible to replace an element in any particular compensator with two elements each having Pth-order dispersion characteristics $D_P$ of half the magnitude of the original element. Preferably, each element's Pth-order dispersion characteristic $D_P$ varies periodically with a period K. In general, the flat response can be built up by an appropriate choice of magnitudes, periods and displacements for the dispersive elements in much the same way as a function can be built up by an appropriate choice of sine and cosine waves in Fourier analysis. Thus, concatenation of dispersive elements with non-identical dispersion characteristics and wavelength shifts that are non-integer multiples of K/Q (including zero) is possible to effect suitable flattening of Pth-order dispersion in the operating bandwidth.

Preferably, the compensator has a net Rth-order dispersion that is non-zero for all R<P (for $R \geq 2$ and $P \geq 3$). Alternatively, the compensator may have a net Rth-order dispersion $D_R$ of zero for at least one R<P (for $R \geq 2$ and $P \geq 3$). The compensator may have a net Rth-order dispersion of zero for all R<P (for $R \geq 2$ and $P \geq 3$). Preferably, half of the dispersive elements exhibit Rth-order dispersion $D_R$ characteristics that are the negative of the Rth-order dispersion characteristics $D_R$ of the other half of the dispersive elements.

Each dispersive element may exhibit a dispersion characteristic of substantially the same form as that of each other dispersive element. Each dispersive element may exhibit a dispersion characteristic of substantially the same magnitude as that of each other dispersive element. Alternatively, the dispersion characteristics may be of the same form but of a different magnitude.

Preferably, the chromatic-dispersion compensator comprises means for actively varying the dispersion with time. Preferably, each of the dispersive elements comprises the means for actively varying the dispersion with time. A substantially polynomial variation in optical path length of polynomial order P will produce a grating chirp substantially of polynomial order (P−1).

Preferably, the chromatic-dispersion compensator comprises means for actively varying the wavelength displacement with time. Preferably, the centre wavelength of the compensator can be tuned by a linear variation with wavelength in the optical path length through the compensator. The optical path lengths may be varied by, for example, thermal means, electrical means or mechanical means.

Preferably, the plurality of dispersive elements form a plurality of groups, each group comprising a plurality of dispersive elements, and in which the dispersion characteristics of the dispersive elements within each group are displaced in wavelength relative to each other and the dispersion characteristics of each group are displaced in wavelength relative to each other.

More preferably, there are two dispersive elements within each group, and there are two groups, and the dispersion characteristics of the elements of a first of the groups are displaced in wavelength relative to each other by an amount and the dispersion characteristics of the elements of a second of the groups are also displaced in wavelength relative to each other by that amount.

The dispersive elements may be polynomially chirped-grating devices. The dispersive elements may be Fibre Bragg gratings. Preferably, the Fibre Bragg gratings are interconnected by a circulator. Alternatively, the dispersive elements may be arrayed-waveguide gratings (AWGs). An AWG typically comprises first and second free-propagation regions (which may comprise, for example, silica for a silica-based AWG) and an array of waveguides interconnecting the first and second free propagation regions, the optical path lengths of any two adjacent waveguides being different. In general, the optical path lengths of adjacent channels increase linearly across the waveguide, but alternatively the optical path lengths of adjacent channels may increase nonlinearly across the waveguide. Alternatively, the optical path lengths of adjacent channels may increase between some adjacent channels and decrease between other adjacent channels across the waveguide.

Preferably, adjacent AWGs will have adjacent free-propagation regions that are connected to each other by N waveguides. More preferably, the waveguides have entrance and exit apertures lying on arcs. Still more preferably, there are apertures at the boundary between adjacent free-propagation regions. An AWG having a single input port can be considered to be a 1×N de-multiplexer and a second such AWG, adjacent to the first, as an N×1 re-multiplexer. N represents the number of ports at the interface between the adjacent AWGs. In a single AWG, N will be the number of output ports from the device as a whole; for concatenated AWGs, however, N becomes a free design parameter, because the ports are internal to the device, and need not even correspond to actual apertures. Thus, N may be chosen to allow the compensator to be tailored for optimum insertion loss and physical size.

Preferably, an active trapezoidal region on the AWG imparts the wavelength displacement. Preferably, the means for varying the dispersion of the compensator is an active region on the AWG having a geometric shape corresponding to the phase polynomial $\theta(\lambda)$ of order P.

Preferably, the chromatic-dispersion compensator comprises one input waveguide. Preferably, the chromatic-dispersion compensator comprises one output waveguide. Preferably, the chromatic-dispersion compensator comprises many input waveguides. Preferably, the chromatic-dispersion compensator comprises many output waveguides.

According to another aspect of the invention, there is provided a chromatic-dispersion compensator comprising two pairs of two dispersive elements, each element exhibiting a Pth-order dispersion characteristic $D_P$ exhibiting a ripple, one dispersive element within each pair having a Rth-order (R<P, $R \geq 2$, $P \geq 3$) dispersion characteristic that is the negative of the dispersion characteristic $D_R$ of the other dispersive element within that pair, the dispersion characteristics of one pair of elements being displaced from a centre wavelength by an amount proportional to a first amount $(T_2-T_3)$ and a second amount $(T_2+T_3)$ respectively and the dispersion characteristics of the other pair of elements being displaced from a centre wavelength by an amount proportional to a third amount $(-T_2-T_3)$ and a fourth amount $(-T_2+T_3)$ respectively, $T_2$ and $T_3$ being such that the net Pth-order dispersion of the compensator is non-zero and does not vary substantially with wavelength over an operating bandwidth.

According to another aspect of the invention there is provided a method of changing the phase of light as a function of frequency, comprising propagating the light through a chromatic-dispersion compensator described above as according to an aspect of the invention.

According to another aspect of the invention, there is provided a method of compensating the dispersion of light arising from propagation in a dispersive optical system, comprising propagating light through a chromatic-dispersion compensator described above as according to an aspect of the invention.

According to another aspect of the invention, there is provided a method of providing dispersion compensation, the method comprising: passing light of a plurality of wavelengths through a plurality of dispersive elements (Q in number, $Q \geq 2$) and dispersing the light in each dispersive element by an amount that varies substantially as a polynomial function of wavelength $D(\lambda)$, the polynomial function being of an order (P−2) greater than 0, the dispersive elements exhibiting dispersion characteristics that are displaced in wavelength relative to each other such that, in passing through all of the elements, the light is dispersed by a net Pth-order dispersion $D_P$ that is non-zero and does not vary substantially with wavelength over an operating bandwidth.

According to another aspect of the invention, there is provided a method of dispersion compensation, the method comprising: (i) providing two pairs of two dispersive elements each exhibiting a Pth-order dispersion characteristic exhibiting a ripple, one dispersive element within each pair having an Rth-order ($R<P$, $R \geq 2$, $P \geq 3$) dispersion characteristic $D_R$ that is the negative of the dispersion characteristic of the other dispersive element within that pair, the dispersion characteristics of one pair of elements being displaced from a centre wavelength by an amount proportional to a first amount $(T_2-T_3)$ and a second amount $(T_2+T_3)$ respectively and the dispersion characteristics of the other pair of elements being displaced from a centre wavelength by an amount proportional to a third amount $(-T_2-T_3)$ and a fourth amount $(-T_2+T_3)$ respectively; (ii) setting $T_2$ to zero and optimising $T_3$ to reduce Rth-order dispersion $D_R$ to zero; (iii) optimising $T_2$ to overlap the ripples to provide a non-zero Pth-order dispersion $D_P$ that does not vary substantially with wavelength over an operating bandwidth.

An embodiment of the invention will now be described, by way of example only, with reference to the accompanying drawings, of which.

Figure 1:
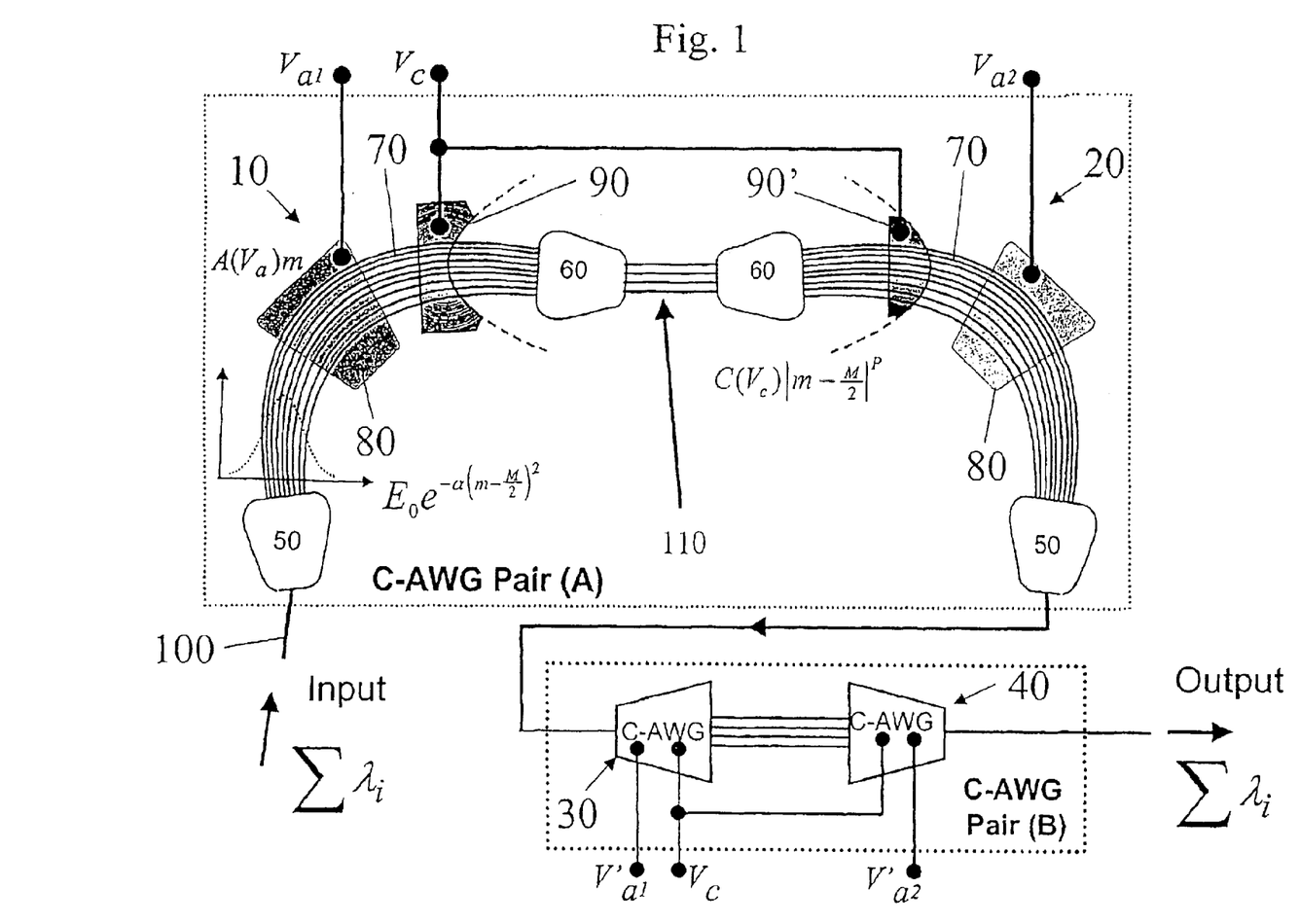
FIG. 1 is a schematic showing a dispersion compensator according to the invention.

The device shown in FIG. 1 consists of four AWGs 10–40 forming pair A and pair B (pair B is not shown in detail but is substantially identical to pair A). Each AWG comprises: free-propagation regions 50, 60 (having arcuate boundaries, but depicted with linear boundaries for ease of representation); waveguide array 70; trapezoidal active region 80; and polynomial active region 90. The characteristics, such as free-spectral range (FSR) and number of arrayed waveguides, of AWGs 10–40 are identical, except that the AWGs' dispersion-compensation wavelength profiles are slightly detuned with respect to one another. (Of course, it is not a requirement of the invention that all characteristics of the dispersive elements be identical, for example, the FSRs may be integer multiples of each other, for example, to achieve a non-integer K/Q.)

Note that polynomial active region 90' in AWG 20 (and AWG 40) is convex whereas polynomial active region 90 in AWG 10 (and AWG 30) is concave. The active regions 90, 90' are thus "negatives" of each other, which results in the dispersion characteristics of AWG 10 being cancelled out by those of AWG 20, for at least some dispersive orders.

Operation of AWG 10 will now be described; in this embodiment, operation of the other AWGs is substantially identical, save for the detuning.

An AWG can be considered to be made up of two free propagation regions, one on the input side and one on the output side of the AWG, which are interconnected by an array of M+1 waveguiding channels, in sequence m=0 to M, with the channels generally having gradually increasing optical path lengths, so that the optical path length of the mth channel is greater than that of the (m−1)th channel. Light comprising single or multiple wavelengths $\Sigma\lambda_i$ is transmitted along optical fibre 100 and then propagates through free-propagation region 50 until it reaches the waveguide array 70. Free-propagation regions 50 and 60 are sufficiently long to allow Fraunhofer diffraction to occur, which means that Fourier optical concepts can be employed in the analysis of the AWG [M. C. Parker et al., *IEEE Journal of Special Topics in Quantum Electronics on Fibre-optic Passive Components*, 5(5), 1379 (1999)]. Waveguide array 70 can be regarded as a Fourier plane within the optical system.

The input light is distributed with a Gaussian envelope amplitude profile $$E_0 \exp\left[-a\left(m - \frac{M}{m}\right)^2\right]$$

across the waveguides of array 70. Polynomial active region 90 is a phase-control means that can be used to produce a programmable phase profile in the array 70 (which is the Fourier plane), which results in a quasi-linear, quasi-quadratic, quasi-cubic or higher-order chirp that exhibits ripple in the device response spectrum.

Active trapezoidal region 80 is a phase-control means used to impose across the array a programmable linear phase profile. The Fourier transform of that imposed profile is a wavelength shift, which manifests itself at plane 110 after propagation away from the Fourier plane through free-propagation region 60.

Each of active regions 80, 90 may for example be a layer of hydrogenated amorphous silicon (α-Si:H) for an AWG based on silicon technology or alternatively a thermo-optic region for an AWG based on silica. Alternatively, the regions may be embodied for example in the form of electrodes in an AWG based on indium phosphide or lithium niobate technology. The phase shift imparted on a given waveguide will be proportional to the optical path length of the channel segment over which the phase control means extends; hence, a cubic phase shift is imparted by an active region having an optical path length varying cubically across the array 70 and a linear phase shift is imparted by an active region having an optical path length varying linearly across the array 70 (for example, a trapezoidal region).

AWG 10 can be considered to be a 1×N de-multiplexer and AWG 20 to be an N×1 re-multiplexer. By designating the free spectral range of the AWGs 10–40 such that FSR=N×200 GHZ, the device shown in FIG. 1 operates as an in-line variable dispersion compensator on all 200 GHZ-ITU-grid channels. N represents the number of ports at the interface between AWG 10 and AWG 20 and so is a free design parameter (as is the number of ports at the interface between AWG 30 and AWG 40), such that the overall device can be tailored for optimum insertion loss and physical size (which tends to scale as approximately 1/FSR).

Pairs 10, 20 and 30, 40 of polynomially chirped AWGs, appropriately detuned with respect to each other, thus have a positive and negative polynomial (of order P) phase profile (equivalent to a nonlinear chirp of order P−1) imposed, by polynomial active regions 90, 90', on their Fourier planes such that the opposite disposition of the chirps ensures a zero level of lower-order dispersions at the centre of the pass-band. However, anti-symmetric (i.e. differential) detuning of each AWG 10–40 via the trapezoidal active region 80 causes the dispersion order of interest to remain finite. Polynomial active regions 90 are symmetric about the longitudinal axis of the AWG so that no detuning occurs. However, it would also be possible to have non-symmetric polynomial active regions 90, 90' and to use trapezoidal active regions 80 to cancel out any resulting detuning.

For the kth output port of a single AWG, the spectral transmission response is given approximately by $$t_k(\lambda) \approx \frac{-j\sqrt{\pi}\, rW}{\lambda R} \sum_{m=0}^{M} \exp\left\{-a\left(m - \frac{M}{2}\right)^2\right\} \exp \qquad (2)$$

$$\left\{j\frac{2\pi n\Delta l}{\lambda}\left[1 + A(V_a) - \frac{Wx_k}{R\Delta l}\right]m + j\frac{2\pi n\Delta l}{\lambda}C(V_c)\left|m - \frac{M}{2}\right|^P\right\}$$

where n is the refractive index, Δl the incremental path length difference between neighbouring waveguides in an equivalent device having no active regions, r is the waveguide mode spot size, R is the length of the free propagation region (FPR), W is the centre-to-centre distance between neighbouring waveguides at the FPR entrance, M+1 is the number of waveguides in the array of each AWG, $x_k$ is the distance of the kth output port from the optical axis and a is the apodisation parameter associated with the assumed Gaussian envelope electric-field amplitude profile across the arrayed waveguides. The integer value of the polynomial order P is the same as the dispersion order to be corrected, i.e. P=2, 3, 4 for second-, third-, fourth-order dispersion compensation respectively. All C-AWGs (chirped AWGs) are assumed to have identical physical and geometric parameters. Analytic solutions to the integral version of equation (2) only exist under tight constraints and generally involve confluent hypergeometric and Whittaker functions. The voltage-dependent coefficient $A(V_a)$ tunes (in trapezoidal region 80) the centre wavelength of light at the kth output port $\lambda_{0,k}$ such that $$\lambda_{0,k} \approx \sqrt{FSRn\Delta l}\left[1 + A(V_a) - \frac{x_k W}{R\Delta l}\right] \qquad (3)$$

By considering an AWG as a planar 4f lens-relay system, Fourier-Fresnel transform theory can be employed [M. C. Parker et al., *IEEE Journal of Special Topics in Quantum Electronics on Fibre-optic Passive Components*, 5(5), 1379 (1999)].

The voltage-dependent polynomial coefficient $C(V_c)$ acts only to control the degree of nonlinear chirping and hence the strength of dispersion compensation. A symmetric phase region ensures that the C-AWG spectral characteristic is not detuned as $C(V_c)$ is varied.

The product of the individual AWG transfer functions gives the overall device response. By appropriate spectral displacement of the AWGs relative to each other, the overall Pth-order dispersion is given by the summation of the individual dispersion characteristics, such that:

$$D_P^{overall}(\lambda) = \sum_{i=1}^{Q} D_{Pi}(\lambda + \Delta\lambda_i) \qquad (4)$$

where Q is the total number of AWGs and $\Delta\lambda_i$, is the spectral displacement for the ith AWG and is an optimisation parameter. Detuning is achieved via parameter $A(V_a)$, which is different for each AWG 10–40 and equals:

| AWG # | Detuning |
|---|---|
| 10 | $A = T_1 + T_2 - T_3$ |
| 20 | $A = T_1 + T_2 + T_3$ |
| 30 | $A = T_1 - T_2 - T_3$ |
| 40 | $A = T_1 - T_2 + T_3$ |

$T_1$ corresponds to the centre wavelength of the AWG operating pass-band. The method of calculating appropriate values of $T_2$ and $T_3$ for a substantially flat, non-zero third-order-dispersion characteristic is as follows:

(i) set $T_2$ to zero and optimise $T_3$ to reduce second-order dispersion to zero;

(ii) optimise $T_2$ to overlap the ripples in the third-order characteristic to provide a non-zero third-order dispersion that does not vary substantially with wavelength over the desired operating bandwidth.

Surprisingly, the inventors have found that the same method can be used with a device having a quartic phase profile (P=4) to optimise for a substantially flat, non-zero fourth-order-dispersion characteristic. Specifically, the method is to:

(i) set $T_2$ to zero and optimise $T_3$ to reduce third-order dispersion to zero;

(ii) optimise $T_2$ to overlap the ripples in the fourth-order characteristic to provide a non-zero fourth-order dispersion that does not vary substantially with wavelength over the desired operating bandwidth.

Surprisingly, the second-order dispersion is also reduced to zero by this method of optimising for fourth-order dispersion.

We simulated a concatenation of AWGs for adaptive third- and fourth-order compensation at 100 Gb/s. Each AWG has a FSR=153.6 nm (96×200 GHz), with M=128 waveguides in each array. For example, N=48 apertures in the interfaces between the AWG re-multiplexing pairs would achieve compensation for all channels spaced by 400 GHz.

Figure 2:
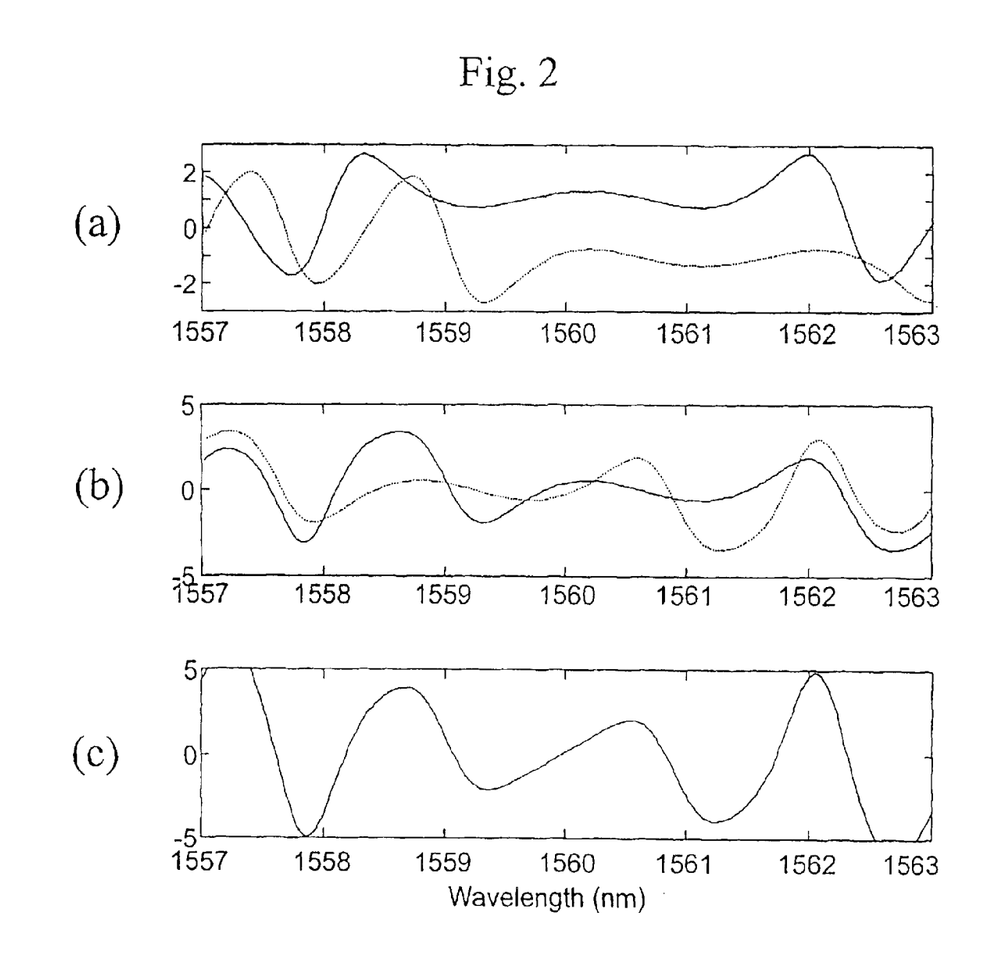
FIG. 2 shows simulated second-order dispersion characteristics as functions of wavelength for the compensator of FIG. 1 optimised for third-order compensation:
(a) first and second AWG within a pair (solid and dashed lines respectively)
(b) first and second AWG pair (solid and dashed lines respectively)
(c) full device
Figure 3:
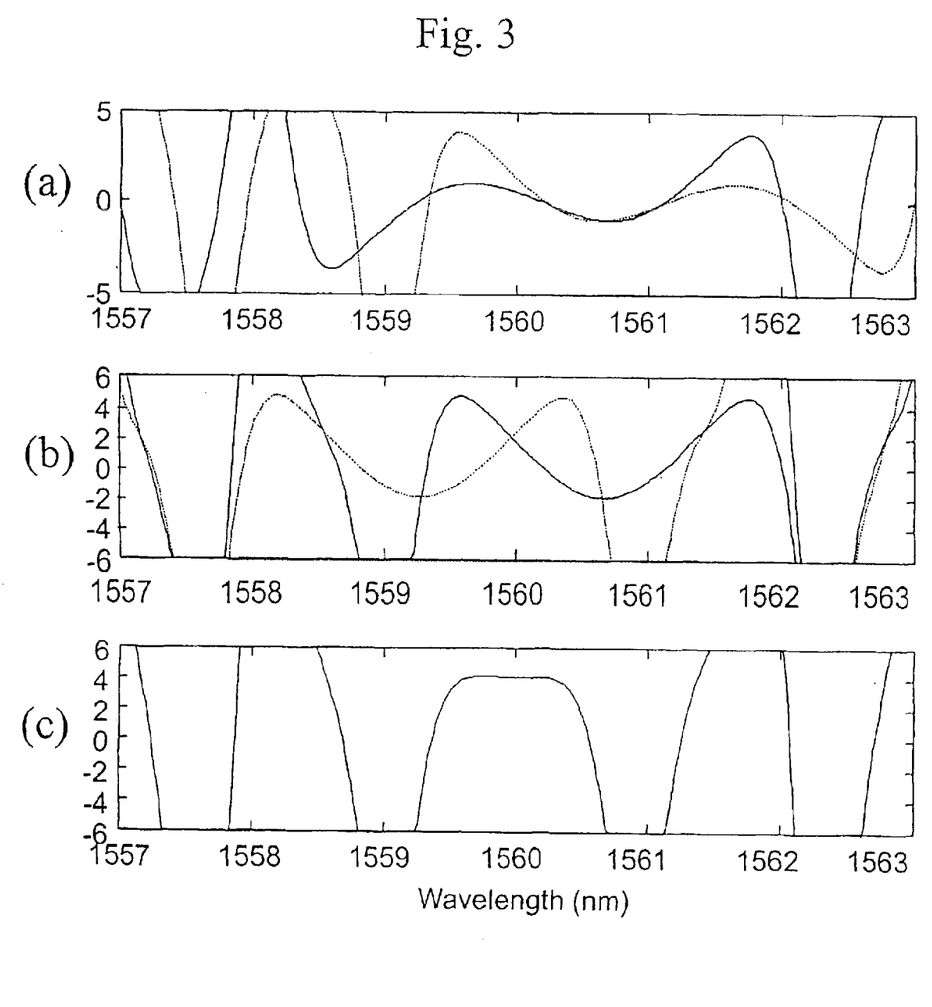
FIG. 3 shows simulated third-order dispersion characteristics as functions of wavelength for the compensator of FIG. 1 optimised for third-order compensation:
(a) first and second AWG within a pair (solid and dashed lines respectively)
(b) first and second AWG pair (solid and dashed lines respectively)
(c) full device
Figure 4:
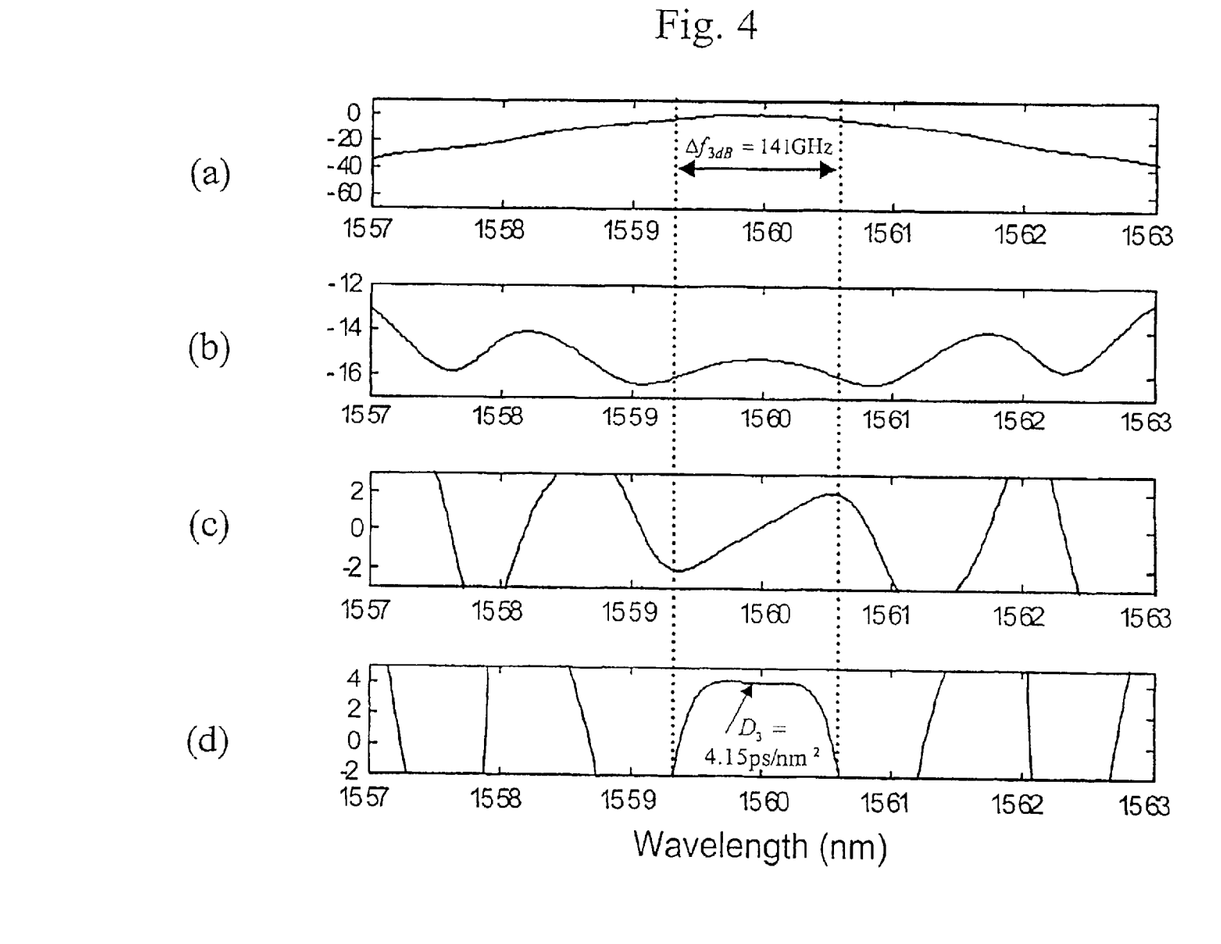
FIG. 4 shows simulated composite characteristics as functions of wavelength for the compensator of FIG. 1 optimised for third-order compensation: (a) normalised transmission $|t(\lambda)|^2$ (dB), (b) group delay $\tau_d$ (ps), (c) second-order dispersion characteristic $D_2(\lambda)$ (ps nm$^{-1}$) (as FIG. 2) and (d) third-order dispersion characteristic $D_3(\lambda)$ (ps nm$^{-2}$) (as FIG. 3).

FIGS. 2 to 4 show the spectral characteristics of a device providing third-order dispersion compensation and also show how optimised detuning can produce smooth overall dispersion characteristics. FIG. 2(a)–(c) shows how the (a) individual, (b) paired and (c) overall AWG second-order dispersion varies at the pass-band centre. It can be seen from FIG. 2(b) that the linear characteristic, passing through zero dispersion, of FIG. 2(c) results from the fact that the characteristic of one AWG pair is the inverse of that of the other (i.e. one transforms into the other by successive reflection about the pass-band centre wavelength and about zero dispersion). FIG. 3 shows the corresponding third-order dispersion characteristics. The flat overall third-order response near the pass-band centre (FIG. 3(c)) results from relative displacement of the third-order characteristics of pair A and pair B (FIG. 3(b)) by about 1.5 nm. Ripples in the characteristics of each pair are thus combined to give a flat response. The displaced central 'M'-shaped portion of the characteristic of the first pair (solid line, FIG. 3(b)) can be seen to result from superposition of the individual characteristics of AWGs 10 and 20 (FIG. 3(a)).

The optimised values for third-order compensation (P=3) are $T_1 = -1.54 \times 10^{-2}$, $T_2 = 3.3 \times 10^{-4}$, $T_3 = 4.4 \times 10^{-4}$. Each AWG has been parabolically chirped to achieve maximum dispersion compensation, such that $$C(V_c)_{max} = \left(\frac{2}{M}\right)^P \frac{FSR}{2\pi\lambda_0} F_M \quad (5)$$

where $$F_M = \frac{7}{5}\pi$$

is the phase change accumulated along the longest waveguide in the array. Here the Gaussian parameter is $\alpha = 0.8$. FIG. 4 indicates that the 3-dB width of the passband is 141 GHz. Simulated insertion loss is at most 5.5 dB per AWG. A symmetric, parabolic group delay $\tau_d$ characteristic (FIG. 4(b)) ensures a linear second-order dispersion characteristic through zero (FIG. 4(c)). The third-order dispersion characteristic (FIG. 4(d)) provides almost ripple-free compensation of up to 4.15 ps nm$^{-2}$ (±0.05 ps nm$^{-2}$) over a 100 GHz range centred on $\lambda_0 = 1560$ nm. That would compensate multiple 100 Gb/s WDM channels for up to 70 km of single-mode fibre, assuming 0.06 ps nm$^{-2}$ km$^{-1}$ third-order dispersion.

FIGS. 5 to 8 show simulation results for a P=4 quartic-phase profile (i.e. cubically chirped) AWG cascade, where the AWGs have the same physical characteristics as before.

Figure 5:
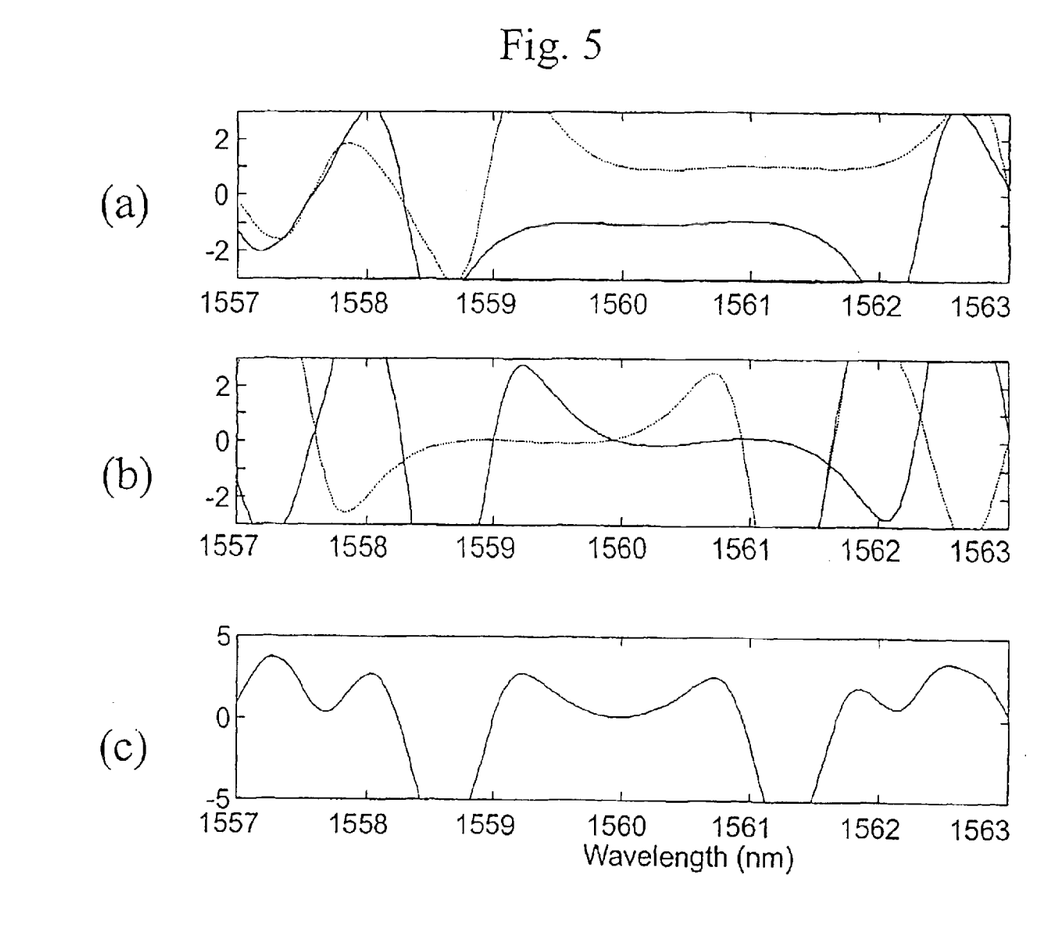
FIG. 5 shows simulated second-order dispersion characteristics as functions of wavelength for the compensator optimised for fourth-order compensation:
(a) first and second AWG within a pair (solid and dashed lines respectively)
(b) first and second AWG pair (solid and dashed lines respectively)
(c) full device

FIG. 5 (a)–(c) shows how the (a) individual and (b) paired AWGs second-order dispersion characteristics combine to produce zero second-order dispersion at the pass-band centre (FIG. 5(c)). In contrast to the locally linear characteristic of FIG. 2(c), the characteristics in this case is locally quadratic about the pass-band centre, touching zero dispersion at its local minimum. FIG. 5(b) shows that the characteristics of one AWG pair is the mirror image of that of the other AWG pair, reflected at the centre wavelength of the pass-band.

Figure 6:
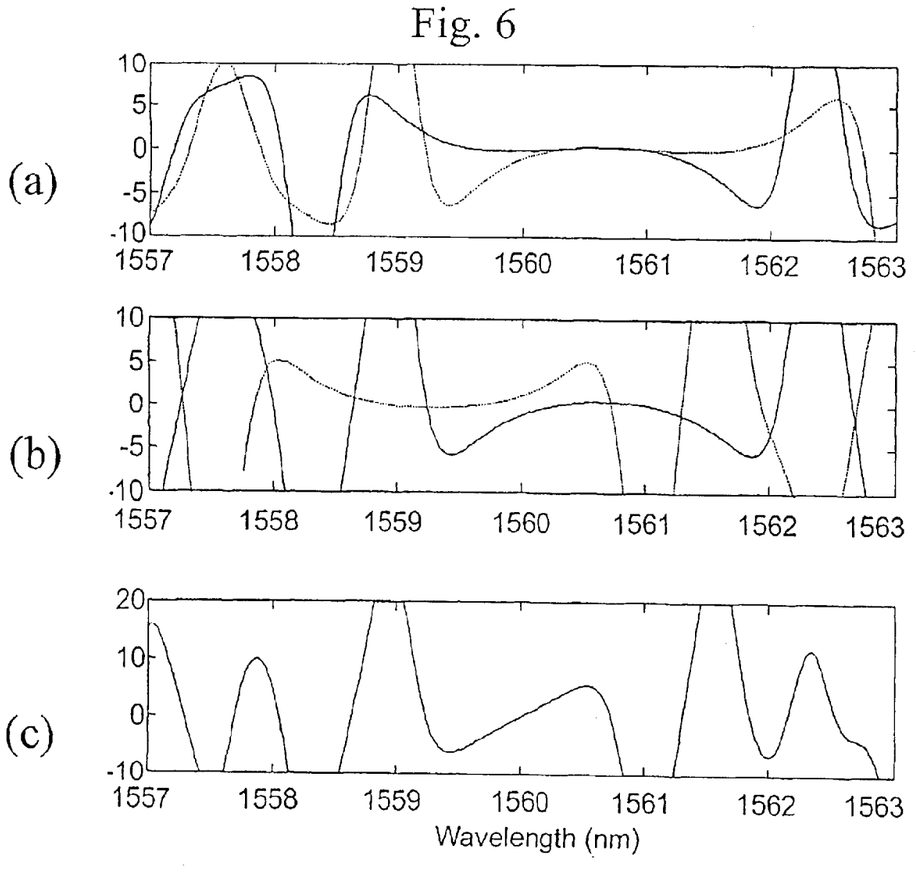
FIG. 6 shows simulated third-order dispersion characteristics as functions of wavelength for the compensator of FIG. 1 optimised for fourth-order dispersion compensation:
(a) first and second AWG within a pair (solid and dashed lines respectively)
(b) first and second AWG pair (solid and dashed lines respectively)
(c) full device.

FIG. 6(c) shows that the quadratic second-order characteristic results in a locally linear third-order characteristic passing through zero at the pass-band centre. Thus zero second- and third- order dispersion at the pass-band centre corresponds to the second-order characteristic being locally a quadratic, having a zero, and also having a stationary point, at the pass-band centre. FIG. 6(b) shows that the linear characteristic, passing through zero of FIG. 6(c) also corresponds to the characteristic of one AWG pair being the inverse of that of the other.

Figure 7:
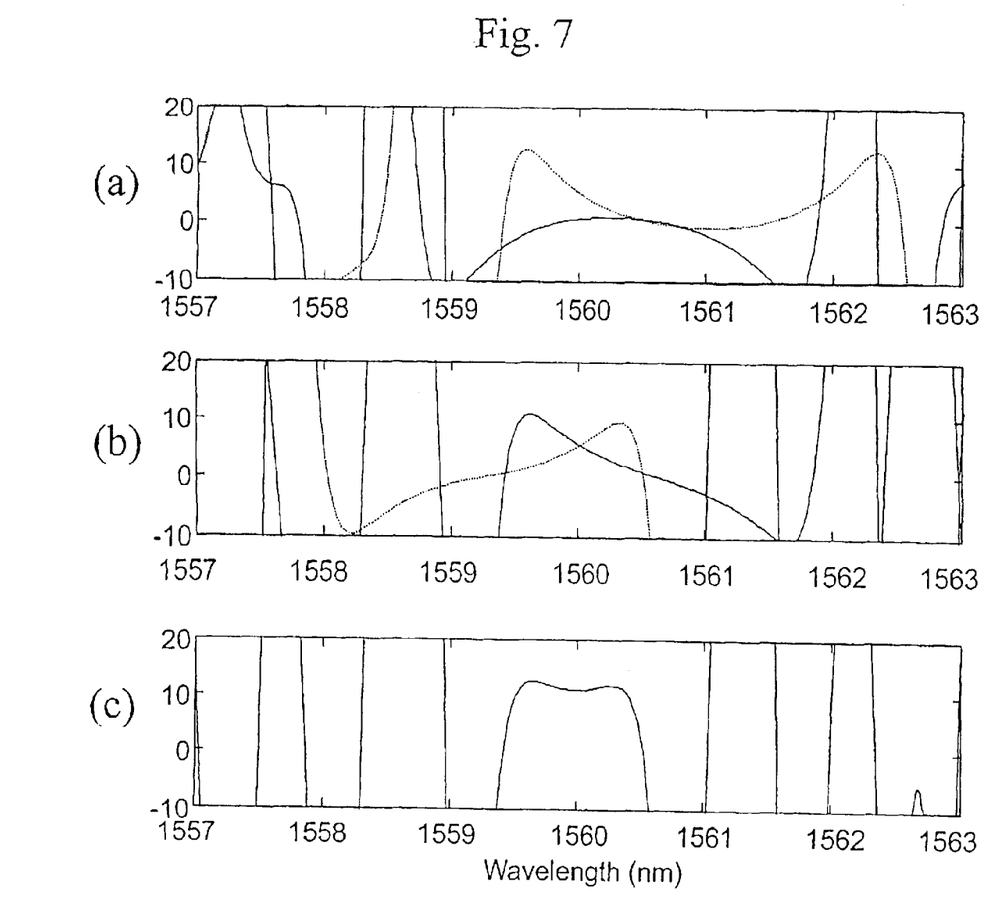
FIG. 7 shows simulated fourth-order dispersion characteristics as functions of wavelength for the compensator of FIG. 1 optimised for fourth-order dispersion compensation:
(a) first and second AWG within a pair (solid and dashed lines respectively)
(b) first and second AWG pair (solid and dashed lines respectively)
(c) full device.

The M-shaped curve of the fourth-order dispersion characteristic (FIG. 7(c)) results from the fourth-order characteristic of each pair being the mirror image of the other and displaced in wavelength from each other. The fourth-order characteristic of Pair A (solid line, FIG. 7(b)) can be seen to result from the superposition of the characteristics of AWGs 10 and 20 (FIG. 7(a)).

Figure 8:
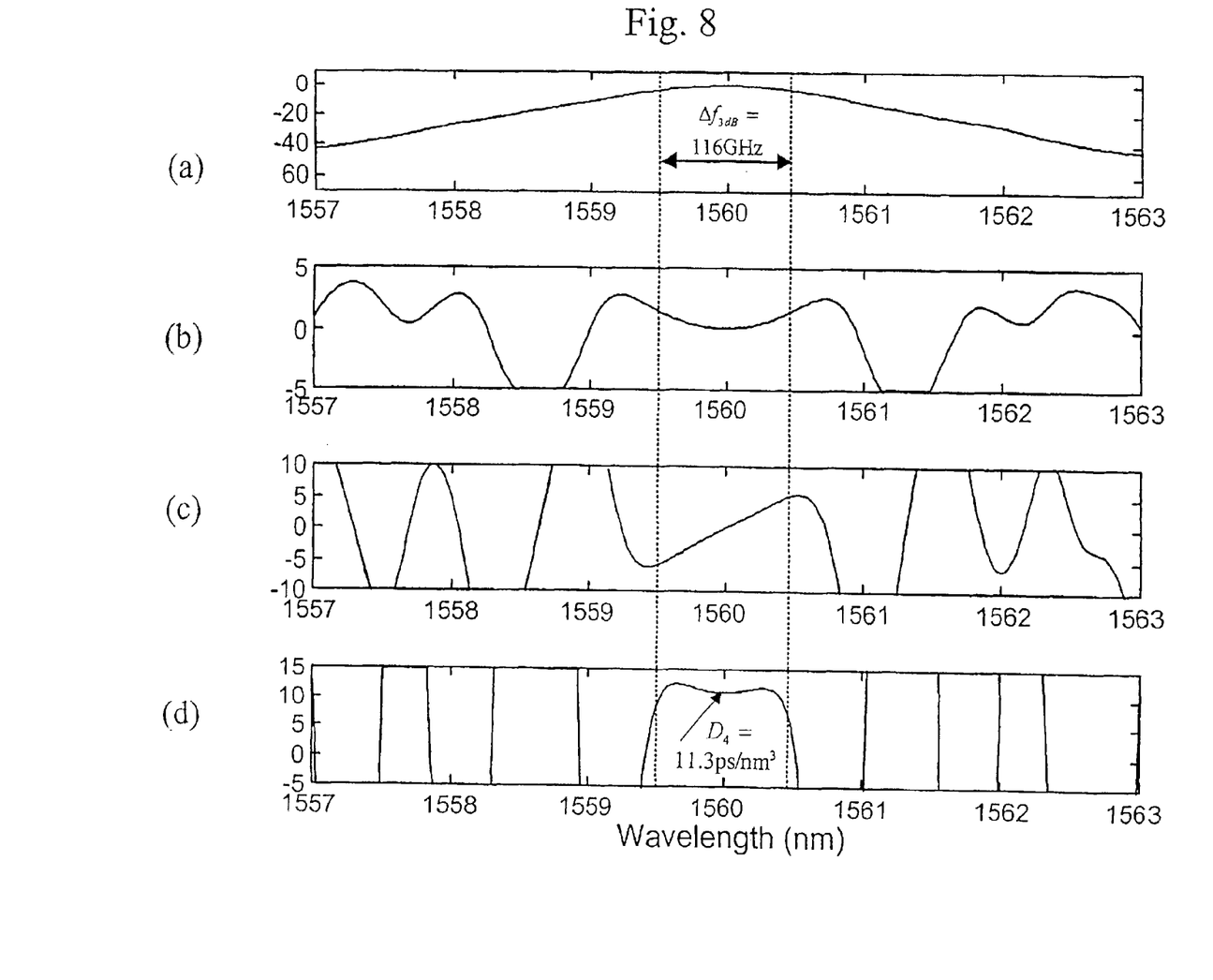
FIG. 8 shows simulated composite characteristics as functions of wavelength for the compensator of FIG. 1 optimised for fourth-order compensation: (a) normalised transmission $|t(\lambda)|^2$ (dB), (b) second-order dispersion characteristic $D_2(\lambda)$ (ps nm$^{-1}$) (as FIG. 5), (c) third-order dispersion characteristic $D_3(\lambda)$ (ps nm$^{-2}$) (as FIG. 6) and (d) fourth-order dispersion characteristic $D_4(\lambda)$ (ps nm$^{-3}$) (as FIG. 7).

We see from FIG. 8 that, for fourth-order compensation, the 3-dB width of the passband is now reduced to 116 GHz, and the fourth-order dispersion characteristic (FIG. 8(d)) provides up to 11.3 ps nm$^{-3}$ compensation, with ±0.6 ps nm$^{-3}$ ripple in the 3 dB passband. The optimised values for fourth-order compensation (P=4) are $T_1 = -1.54 \times 10^{-2}$, $T_2 = 1.9 \times 10^{-4}$, $T_3 = 4.3 \times 10^{-4}$.

Figure 9:
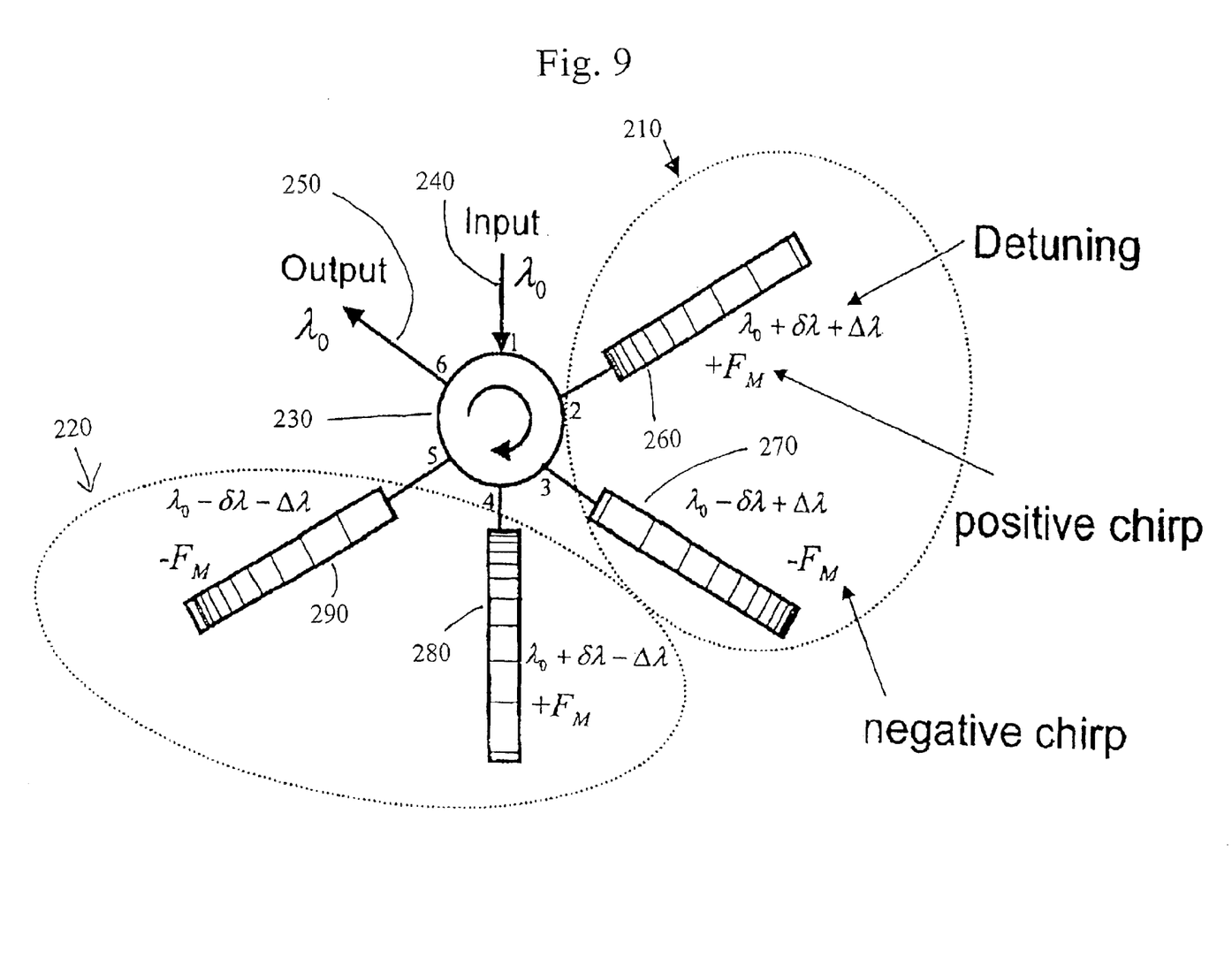
FIG. 9 shows a chirped fibre Bragg grating carousel based on a 6-port optical circulator, suitable for third-or fourth-order dispersion compensation.

The AWG cascade of FIG. 1 is equivalent to a carousel of fibre Bragg gratings 260, 270, 280, 290 (operating in a reflective mode) around a 6-port optical circulator 230, as shown in FIG. 9. In general, for a dispersion compensator device consisting of Q chirped FBGs (dispersive elements) a 'Q+2'-port optical circulator is required, since two extra ports for the input and output waveguides 240, 250 are also required. (It should be noted that higher-port-count optical circulators are easily made by appropriately concatenating multiple lower-port-count optical circulators.) The two groups 210, 220 each consist of two FBGs (260, 270; 280,290), one 260, 280 positively chirped and one 270, 290 negatively polynomially chirped. The strength of chirping is given by the value assigned to $F_M$. Equation (5) relates the value of the appropriate FBG chirp $F_M$ to the equivalent value of the coefficient $C(V_c)_{max}$ in a chirped AWG. The FBGs 260–290 are detuned with respect to each other by appropriate amounts $\pm\delta\lambda\pm\Delta\lambda$ (equivalent to the AWG detunings proportional to $\pm T_2 \pm T_3$ associated with the AWG embodiment) from the centre wavelength $\lambda_0$, to achieve the appropriate flat third- or fourth-order dispersion characteristics over the pass-band range of interest. We note that since AWGs tend to operate at high grating orders, the small free-spectral range (FSR) allows multiple wavelengths to be dispersion compensated. This would imply that long period FBGs operating at similarly high-orders would also be suitable for multiple wavelength use.

In FIGS. 2 to 9, we have only simulated low-ripple compensation using two-phase concatenation of grating pairs. However, polyphase concatenation is also possible to reduce ripple still further.

The device described above may be employed as a fine-tuning dispersion compensation element in conjunction with a fixed dispersion compensation device (e.g. dispersion compensation fibre), itself compensating for the second- and higher-order dispersion of a fixed length of 100 km of single-mode fibre. Such a device can be usefully employed in long-haul submarine or terrestrial systems, where automatic dispersion correction is a desirable feature. It will be appreciated that various modifications and variations can be made to the designs described above.

What is claimed is:

1. A chromatic-dispersion compensator comprising a plurality of dispersive elements each exhibiting a dispersion characteristic that varies substantially as a polynomial function of wavelength, the polynomial function being of an order (P−2) greater than 0, the dispersion characteristics of the dispersive elements being displaced in wavelength relative to each other such that the compensator has a net Pth-order dispersion characteristic that is non-zero and does not vary substantially with wavelength over an operating bandwidth.

2. A chromatic-dispersion compensator as claimed in claim 1, wherein the dispersive elements are polynomially chirped-grating devices.

3. A chromatic-dispersion compensator as claimed in claim 2, wherein the dispersive elements are arrayed-waveguide gratings (AWGs).

4. A chromatic-dispersion compensator as claimed in claim 3, wherein adjacent AWGs comprise adjacent free-propagation regions that are connected to each other by waveguides.

5. A chromatic-dispersion compensator as claimed in claim 4, wherein the waveguides comprise entrance and exit apertures lying on arcs.

6. A chromatic-dispersion compensator as claimed in claim 4, further comprising apertures at a boundary between adjacent free-propagation regions.

7. A chromatic-dispersion compensator as claimed in claim 3, wherein an active trapezoidal region on the AWG imparts the wavelength displacement.

8. A chromatic-dispersion compensator as claimed in claim 3, further comprising means for actively varying the dispersion with time, wherein the means for varying the dispersion comprising an active region on the AWG having a geometric shape corresponding to a phase polynomial of order P.

9. A chromatic-dispersion compensator as claimed in claim 2, wherein the dispersive elements are fibre Bragg gratings.

10. A chromatic-dispersion compensator as claimed in claim 9, wherein the fibre Bragg gratings are interconnected by a circulator.

11. A chromatic-dispersion compensator as claimed in claim 1, wherein the compensator has a net Rth-order dispersion of zero for at least one R<P (for R≧2 and P≧3).

12. A chromatic-dispersion compensator as claimed in claim 1, wherein the compensator has a net Rth-order dispersion of zero for all R<P (for R≧2 and P≧3).

13. A chromatic-dispersion compensator as claimed in claim 1, further comprising means for actively varying the dispersion with time.

14. A chromatic-dispersion compensator as claimed in claim 13, wherein each of the dispersive elements comprises the means for actively varying the dispersion with time.

15. A chromatic-dispersion compensator as claimed in claim 1, wherein the plurality of dispersive elements form a plurality of groups, each group comprising a plurality of dispersive elements, and wherein the dispersion characteristics of the dispersive elements within each group are displaced in wavelength relative to each other and the dispersion characteristics of each group are displaced in wavelength relative to each other.

16. A chromatic-dispersion compensator as claimed in claim 15, wherein there are two dispersive elements within each group, and there are two groups, and wherein the dispersion characteristics of the elements of a first of the groups are displaced in wavelength relative to each other by an amount and the dispersion characteristics of the elements of a second of the groups are displaced in wavelength relative to each other by that amount.

17. A chromatic-dispersion compensator as claimed in claim 1, wherein the compensator has a net Rth-order dispersion that is non-zero for all R<P (for R≧2 and P≧3).

18. A chromatic-dispersion compensator as claimed in claim 1, wherein each dispersive element exhibits a dispersion characteristic of substantially the same form as that of each other dispersive element.

19. A chromatic-dispersion compensator as claimed in claim 1, wherein each dispersive element exhibits a dispersion characteristic of substantially the same magnitude as that of each other dispersive element.

20. A chromatic-dispersion compensator as claimed in claim 1, wherein half of the dispersive elements exhibit Rth-order (R<P) dispersion characteristics that are the negative of the Rth-order dispersion characteristics of the other half of the dispersive elements.

21. A chromatic-dispersion compensator as claimed in claim 1, wherein each element's Pth-order dispersion characteristic varies periodically.

22. A chromatic-dispersion compensator as claimed in claim 1, further comprising means for actively varying the wavelength displacement with time.

23. A chromatic-dispersion compensator as claimed in claim 1, wherein the center wavelength of the compensator can be tuned by a linear variation with wavelength in the optical path length through the compensator.

24. A chromatic-dispersion compensator as claimed in claim 1, comprising one or more input waveguide.

25. A chromatic-dispersion compensator as claimed in claim 1, comprising one or more output waveguide.

26. A method of changing the phase of light as a function of frequency, comprising propagating the light through a chromatic-dispersion compensator as claimed in claim 1.

27. A method of compensating the dispersion of light arising from propagation in a dispersive optical system, comprising propagating light through a chromatic-dispersion compensator as claimed in claim 1.

28. A chromatic-dispersion compensator comprising two pairs of two dispersive elements, each element exhibiting a Pth-order dispersion characteristic exhibiting a ripple, one dispersive element within each pair having a Rth-order (wherein R<P (R≧2 and P≧3) dispersion characteristic that is the negative of the dispersion characteristic of the other dispersive element within that pair, the dispersion characteristics of one pair of elements being displaced from a center wavelength by an amount proportional to a first amount $(T_2-T_3)$ and a second amount $(T_2+T_3)$ respectively and the dispersion characteristics of the other pair of elements being displaced from a center wavelength by an amount proportional to a third amount $(-T_2-T_3)$ and a fourth amount $(-T_2+T_3)$ respectively, $T_2$ and $T_3$ being such that the net Pth-order dispersion of the compensator is non-zero and does not vary substantially with wavelength over an operating bandwidth.

29. A method of providing dispersion compensation, the method comprising: passing light of a plurality of wavelengths through a plurality of dispersive elements and dispersing the light in each dispersive element by an amount that varies substantially as a polynomial function of wavelength, the polynomial function being of an order (P−2) greater than 0, the dispersive elements exhibiting dispersion characteristics that are displaced in wavelength relative to each other such that, in passing through all of the elements, the light is dispersed by a net Pth-order dispersion that is non-zero and does not vary substantially with wavelength over an operating bandwidth.

30. A method of dispersion compensation, the method comprising:

(i) providing two pairs of two dispersive elements each exhibiting a Pth-order dispersion characteristic exhibiting a ripple, one dispersive element within each pair having a Rth-order (R<P, R≧2 and P≧3) dispersion characteristic that is the negative of the dispersion characteristic of the other dispersive element within that pair, the dispersion characteristics of one pair of elements being displaced from a center wavelength by an amount proportional to a first amount $(T_2-T_3)$ and a second amount $(T_2+T_3)$ respectively and the dispersion characteristics of the other pair of elements being displaced from a center wavelength by an amount proportional to a third amount $(-T_2-T_3)$ and a fourth amount $(-T_2+T_3)$ respectively;

(ii) setting $T_2$ to zero and optimising $T_3$ to reduce Rth-order dispersion to zero;

(iii) optimising $T_2$ to overlap the ripples to provide a non-zero Pth-order dispersion that does not vary substantially with wavelength over an operating bandwidth.

* * * * *

UNITED STATES PATENT AND TRADEMARK OFFICE
CERTIFICATE OF CORRECTION

| | | |
|---|---|---|
| PATENT NO. | : 6,952,512 B2 | |
| APPLICATION NO. | : 10/471924 | |
| DATED | : October 4, 2005 | |
| INVENTOR(S) | : Parker et al. | |

It is certified that error appears in the above-identified patent and that said Letters Patent is hereby corrected as shown below:

Title Page, item (57) Abstract, Line 2, after "Q in number" delete "." and insert -- , --.
Title Page, item (57) Abstract, Line 9, after "wavelength" insert -- over --.

Signed and Sealed this

Second Day of January, 2007

JON W. DUDAS
*Director of the United States Patent and Trademark Office*